(12) United States Patent
Thelin et al.

(10) Patent No.: US 12,440,898 B2
(45) Date of Patent: Oct. 14, 2025

(54) NOZZLE FOR PROVIDING COOLANT FLUID TO A CUTTING EDGE OF A METAL CUTTING TOOL AND A METAL CUTTING TOOL

(71) Applicant: SECO TOOLS AB, Fagersta (SE)

(72) Inventors: Jimmy Thelin, Fagersta (SE); Roger Granstrom, Fagersta (SE)

(73) Assignee: Seco Tools AB, Fagersta (SE)

( * ) Notice: Subject to any disclaimer, the term of this patent is extended or adjusted under 35 U.S.C. 154(b) by 383 days.

(21) Appl. No.: 17/921,493

(22) PCT Filed: Apr. 19, 2021

(86) PCT No.: PCT/EP2021/060083
§ 371 (c)(1),
(2) Date: Oct. 26, 2022

(87) PCT Pub. No.: WO2021/219417
PCT Pub. Date: Nov. 4, 2021

(65) Prior Publication Data
US 2023/0191498 A1    Jun. 22, 2023

(30) Foreign Application Priority Data
Apr. 27, 2020 (EP) ..................... 20171564

(51) Int. Cl.
*B23B 27/10* (2006.01)
*B05B 1/14* (2006.01)
*B23B 5/28* (2006.01)

(52) U.S. Cl.
CPC ............ *B23B 27/10* (2013.01); *B05B 1/14* (2013.01); *B23B 5/28* (2013.01); *B23B 2250/12* (2013.01)

(58) Field of Classification Search
CPC . B23B 27/10; B23B 2250/12; B23B 27/1625; B23B 27/1677; B23B 2231/24;
(Continued)

(56) References Cited

U.S. PATENT DOCUMENTS 160,161  A  *  2/1875  Clay .................. B23B 27/10
                                                              407/85
522,588  A  *  7/1894  Chouteau ............ B25D 3/00
                                                              407/11
(Continued)

FOREIGN PATENT DOCUMENTS

CN        204430302 U      7/2015
CN        107708899 A      2/2018
(Continued)

*Primary Examiner* — Sara Addisu
(74) *Attorney, Agent, or Firm* — Corinne R. Gorski

(57) ABSTRACT

A nozzle is arranged to provide coolant fluid to a cutting edge of a metal cutting tool. The nozzle includes at least one internal inlet coolant channel and at least one internal outlet coolant channel. The internal inlet coolant channel is connected to a coolant inlet and the at internal outlet coolant channel is connected to a coolant outlet for directing the coolant fluid to the cutting edge. The nozzle further includes a plenum chamber having at least one inlet opening connecting the internal inlet coolant channel and the plenum chamber and at least one outlet opening connecting the internal outlet channel and the plenum chamber. Each of the inlet openings have a cross-sectional area $A1_i$ and each of the outlet openings have a cross-sectional area $A2_i$, wherein— $\Sigma_{i=1}^{n} A1_i > \Sigma_{i=1}^{m} A2_i$, where i is an integer, n is the number of inlet openings, and m is the number of outlet openings.

7 Claims, 5 Drawing Sheets

(58) Field of Classification Search
CPC .. B05B 1/14; B05B 1/34; B05B 9/035; B23C 5/28; B23C 5/282
See application file for complete search history.

(56) References Cited

U.S. PATENT DOCUMENTS

| | | | | |
|---|---|---|---|---|
| 4,848,198 | A * | 7/1989 | Royal | B23B 25/02 407/11 |
| 5,718,156 | A * | 2/1998 | Lagrolet | B23B 27/1666 407/11 |
| 6,652,200 | B2 * | 11/2003 | Kraemer | B23B 27/1677 407/104 |
| 7,568,864 | B2 * | 8/2009 | Sjoo | B23B 27/04 407/11 |
| 8,529,162 | B2 * | 9/2013 | Hecht | B23B 27/1677 407/107 |
| 8,696,259 | B2 * | 4/2014 | Hecht | B23B 27/10 407/101 |
| 8,827,598 | B2 * | 9/2014 | Henry | B23B 27/10 407/11 |
| 9,387,537 | B2 * | 7/2016 | Hoffer | B23Q 11/10 |
| 9,434,011 | B2 * | 9/2016 | Morrison | B23Q 11/1076 |
| 9,586,263 | B2 * | 3/2017 | Frota de Souza Filho | B23B 29/12 |
| 10,007,246 | B2 * | 6/2018 | Grant | B23Q 11/1053 |
| 10,029,313 | B2 * | 7/2018 | Kaufmann | B33Y 80/00 |
| 10,300,532 | B2 * | 5/2019 | Chen | B23B 27/10 |
| 10,710,166 | B2 * | 7/2020 | Nagae | B23C 5/28 |
| 10,730,115 | B2 * | 8/2020 | Amstibovitsky | B23B 27/10 |
| 10,946,452 | B2 * | 3/2021 | Thuresson | B23B 27/10 |
| 11,059,104 | B2 * | 7/2021 | Kobayashi | B23B 27/04 |
| 11,065,693 | B2 * | 7/2021 | Hirano | B23B 27/10 |
| 11,253,930 | B2 * | 2/2022 | Henzler | B23B 27/08 |
| 11,344,953 | B2 * | 5/2022 | Hirano | B23B 27/1677 |
| 11,440,101 | B2 * | 9/2022 | Luik | B33Y 80/00 |
| 11,541,499 | B2 * | 1/2023 | Fang | B23C 5/202 |
| 11,583,934 | B2 * | 2/2023 | Larsson | B33Y 80/00 |
| 11,590,587 | B2 * | 2/2023 | McKinley | B23B 51/0684 |
| 11,806,792 | B2 * | 11/2023 | Kobayashi | B23B 1/00 |
| 11,890,684 | B2 * | 2/2024 | Larsson | B23B 27/10 |
| 12,202,050 | B2 * | 1/2025 | Eichelberger | B33Y 80/00 |
| 2002/0122698 | A1 | 9/2002 | Lagerberg | |
| 2008/0124180 | A1 * | 5/2008 | Breisch | B23B 27/10 408/713 |
| 2010/0196105 | A1 * | 8/2010 | Amstibovitsky | B23B 27/10 407/11 |
| 2011/0305531 | A1 * | 12/2011 | Amstibovitsky | B23B 27/10 407/11 |
| 2011/0311323 | A1 * | 12/2011 | Hecht | B23B 27/1677 407/107 |
| 2012/0230780 | A1 * | 9/2012 | Henry | B23B 27/10 407/11 |
| 2013/0078043 | A1 * | 3/2013 | Henry | B23B 27/1622 407/11 |
| 2013/0129428 | A1 * | 5/2013 | Henry | B23D 15/14 407/11 |
| 2013/0202372 | A1 * | 8/2013 | Hecht | B23B 27/10 407/107 |
| 2014/0099168 | A1 * | 4/2014 | Schaefer | B23B 29/043 407/11 |
| 2014/0334887 | A1 * | 11/2014 | Flolo | B23B 27/1666 407/11 |
| 2014/0369772 | A1 * | 12/2014 | Chen | B23B 27/1677 407/11 |
| 2015/0132074 | A1 * | 5/2015 | Boissonnet | B23B 27/1625 407/11 |
| 2015/0290716 | A1 * | 10/2015 | Herberth | B23B 27/22 407/11 |
| 2016/0067786 | A1 * | 3/2016 | Thelin | B23B 27/007 407/11 |
| 2016/0175938 | A1 * | 6/2016 | Kaufmann | B23B 27/10 407/11 |
| 2018/0161885 | A1 * | 6/2018 | Forsberg | B23B 27/10 |
| 2019/0001454 | A1 * | 1/2019 | Huang | B23B 27/10 |
| 2019/0030612 | A1 * | 1/2019 | Larsson | B23B 27/10 |
| 2019/0030613 | A1 * | 1/2019 | Larsson | B23B 27/1662 |
| 2019/0160549 | A1 * | 5/2019 | Amstibovitsky | B23B 27/04 |
| 2019/0247926 | A1 | 8/2019 | Fang et al. | |
| 2019/0308250 | A1 | 10/2019 | Larsson et al. | |
| 2020/0230710 | A1 * | 7/2020 | Hirano | B23B 27/1677 |
| 2022/0063001 | A1 * | 3/2022 | Burkle | B23B 27/10 |

FOREIGN PATENT DOCUMENTS

| | | | | |
|---|---|---|---|---|
| DE | 102009060046 A1 * | 6/2011 | | B23B 27/10 |
| EP | 1080811 A1 | 3/2001 | | |
| EP | 1495840 A1 | 1/2005 | | |
| EP | 3167985 A1 | 5/2017 | | |
| EP | 3219421 A1 | 9/2017 | | |
| EP | 3903973 A1 * | 11/2021 | | B05B 1/14 |
| WO | 2017179972 A1 | 10/2017 | | |
| WO | WO-2018139401 A1 * | 8/2018 | | B23B 27/10 |

* cited by examiner

NOZZLE FOR PROVIDING COOLANT FLUID TO A CUTTING EDGE OF A METAL CUTTING TOOL AND A METAL CUTTING TOOL

RELATED APPLICATION DATA

This application is a § 371 National Stage Application of PCT International Application No. PCT/EP2021/060083 filed Apr. 19, 2021 claiming priority to EP 20171564.6 filed Apr. 27, 2020.

TECHNICAL FIELD

The present invention relates to a nozzle for providing coolant fluid to a cutting edge of a metal cutting tool and to such a metal cutting tool.

BACKGROUND

In some metal cutting applications, very high temperatures are generated which results in a high heat load on the cutting tool which leads to a decreased lifetime of the tool.

In order to decrease the temperature and thereby increasing the lifetime of the tool, coolant fluid could be delivered as close to the cutting edge as possible. A number of cooling systems are available on the market today where coolant fluid delivery is supplied through the tool holder and coolant nozzles at high pressure, e.g. EP 3167985 A1.

However, in some applications, a problem with the existing systems is that they are unsatisfactory in their ability to reduce the heat load of the cutting edge and thereby increase the lifetime of the cutting tool.

SUMMARY

It is an object to the present invention to overcome, or at least partially overcome, said problem by introducing a nozzle for providing coolant fluid to a cutting edge of a metal cutting tool, and such a metal cutting tool, where the coolant effect is increased.

The object of the present invention is achieved by means of a nozzle for providing coolant fluid to a cutting edge of a metal cutting tool, wherein the nozzle comprises
at least one internal inlet coolant channel,
at least one internal outlet coolant channel, wherein
the at least one internal inlet coolant channel is connected to a coolant inlet, and
the at least one internal outlet coolant channel is connected to a coolant outlet for directing the coolant fluid to the cutting edge, characterized in that the nozzle further comprises
a plenum chamber comprising
at least one inlet opening connecting the at least one internal inlet coolant channel and the plenum chamber, and
at least one outlet opening connecting the at least one internal outlet channel and the plenum chamber, wherein
each of the at least one inlet openings have a cross-sectional area $A1_i$, and
each of the at least one outlet openings have a cross-sectional area $A2_i$, wherein $$\Sigma_{i=1}^{n} A1_i > \Sigma_{i=1}^{m} A2_i,$$

where i is an integer, n is the number of inlet openings, and m is the number of outlet openings.

By introducing a plenum chamber into the nozzle where the total cross-sectional area of the inlet openings is larger than the total cross-sectional area of the outlet openings, the plenum chamber will be filled with coolant fluid which will increase the fluid pressure in the subsequent internal outlet channels and thereby also at the coolant outlets. By providing coolant fluid with an increased pressure towards the cutting edge, the chip breaking properties of the coolant fluid will increase, which will contribute to reducing the friction between the chip and the tool and thereby reducing the heat load on the tool.

The term "nozzle" represents a unit, preferably a removable unit, for delivering coolant fluid to the cutting edge, preferably as close as possible to the cutting edge. A nozzle can for example be realized in form of a clamp or inducer.

The term "coolant fluid" represents a fluid, either in liquid or gaseous form, for improving the cutting conditions and also the tool life. This type of fluid is also commonly designated as "coolant", "cutting fluid", "cutting oil", or "lubrication fluid".

The plenum chamber is is an internal volume of any geometrical shape that could be filled with coolant fluid in order to build up a fluid pressure, such as a "chamber", "cavity", "container" or "reservoir".

The inlet openings can have any geometric shape and are adapted to connect the inlet channels with the plenum chamber.

The outlet openings can have any geometric shape and are adapted to connect the outlet channels with the plenum chamber.

According to at least one embodiment, the cross-sectional area represents an area perpendicular to the flow direction measured at the inner wall of the inlet and outlet openings.

According to one embodiment, the at least one outlet opening is fully located in a plane P, and the coolant outlet is located in a plane Q, wherein the plane P is parallel with the plane Q. By having the outlet openings parallel with the coolant outlets, the outlet coolant channels will have a minimum impact on the ejected coolant fluid which will contribute to maintaining the high pressure of the coolant fluid at the coolant outlets.

According to another embodiment, the planes Q and P are arranged at an acute angle to each other. By having this type of orientation the direction of the ejected coolant fluid can be arranged to an optimum.

According to one embodiment, the at least one internal coolant outlet channel is linear with a constant cross-sectional area $A2_i$. By having a linear outlet coolant channel with a constant cross-sectional area corresponding to the cross-sectional area of the corresponding outlet opening, the outlet coolant channel will have a minimum impact on the ejected coolant fluid, which will contribute to maintaining the high pressure of the coolant fluid at the coolant outlet.

According to another embodiment, the at least one outlet coolant channel has a cone-shape, i.e. the diameter of the at least one outlet coolant channel decreases as it goes from the plenum chamber towards the coolant outlet. By having this cone-shaped outlet coolant channel, the fluid pressure in the outlet coolant channel can be further increased.

According to one embodiment, the at least one internal outlet coolant channel has a length $L_{out}$, wherein 0.5 mm≤$L_{out}$≤2.0 mm. A shorter outlet coolant channel will decrease the channels impact on the pressure. In some applications, a longer channel than 2.0 mm will have a too large impact on the pressure of the coolant and is therefore not desirable. In some applications, a shorter outlet channel than 0.5 mm will have a negative impact to the nozzle's strength at its outermost portion and is therefore not desirable.

According to one embodiment, the relation between the total inlet opening cross-sectional area and the total outlet opening cross-sectional area is $$1.3 \leq \frac{\sum_{i=1}^{n} A1_i}{\sum_{i=1}^{m} A2_i} \leq 56.3$$

A high ratio between the total inlet opening cross-sectional area and the total outlet opening cross-sectional area will increase the amount of fluid in the plenum chamber and thus also the fluid pressure in the outlet coolant channels. In some applications, a lower ratio than 1.3 will not give rise to the preferred increase of fluid pressure. In some applications, a higher ratio than 56.3 will have a negative impact on the strength of the plenum chamber due to the lack of solid material.

According to one embodiment, 1.5 mm² ≤ A1$_i$ ≤ 15.0 mm². In some applications, a smaller cross-sectional area than 1.5 mm² of the at least one inlet opening will result in that not enough coolant fluid can be provided to the cutting edge in order to achieve the preferred coolant effect as the corresponding outlet opening becomes too small since the ratio discussed above needs to be maintained. In some applications, a larger cross-sectional area of the at least one inlet opening will have a negative impact on the strength of the plenum chamber due to the lack of solid material.

According to one embodiment, the plenum chamber has an internal volume V, wherein 40 mm³ ≤ V ≤ 420 mm³. In some applications, a smaller internal volume than 40 mm³ will not be able to create the amount of fluid pressure needed to achieve the preferred coolant effect. In some applications, a higher internal volume than 420 mm³ will have a negative impact on the strength of the nozzle due to the lack of solid material.

According to one embodiment, the nozzle comprises at least two internal outlet coolant channels. By having a plurality of outlet coolant channels, the coolant fluid can be provided to a larger part of the cutting edge.

According to one embodiment, the nozzle comprises at least two plenum chambers, wherein each plenum chamber comprises
at least one inlet opening connecting the plenum chamber with at least one internal inlet coolant channel, and
at least one outlet opening connecting the plenum chamber with at least one internal outlet coolant channel.

By having a plurality of plenum chambers, the ejected coolant fluid can be controlled to different pressures on different parts of the cutting edge, resulting in a more adaptable cooling system.

The object of the present invention is further achieved by means of a metal cutting tool, comprising
a tool holder body,
a cutting insert mounted in the tool holder body, and
a nozzle, as described above, attached to the tool holder body.

The metal cutting tool is preferably a turning tool, but can also be any other type of metal cutting tool e.g. a milling cutter.

The cutting insert may be a cubic boron nitride cutting insert, a cemented carbide cutting insert, a cermet cutting insert, or a ceramic cutting insert, depending on application.

According to one embodiment, the nozzle is a removable nozzle attached to the tool holder body. By having a removable nozzle attached to the tool, the nozzle can be easily changed if necessary.

According to one embodiment, the nozzle is a clamp pressing against a part of the cutting insert. Such nozzle achieves that the number of components in the tool can be decreased since there is no need for a separate clamp to hold the insert in the tool holder body.

DETAILED DESCRIPTION

Figure 1:
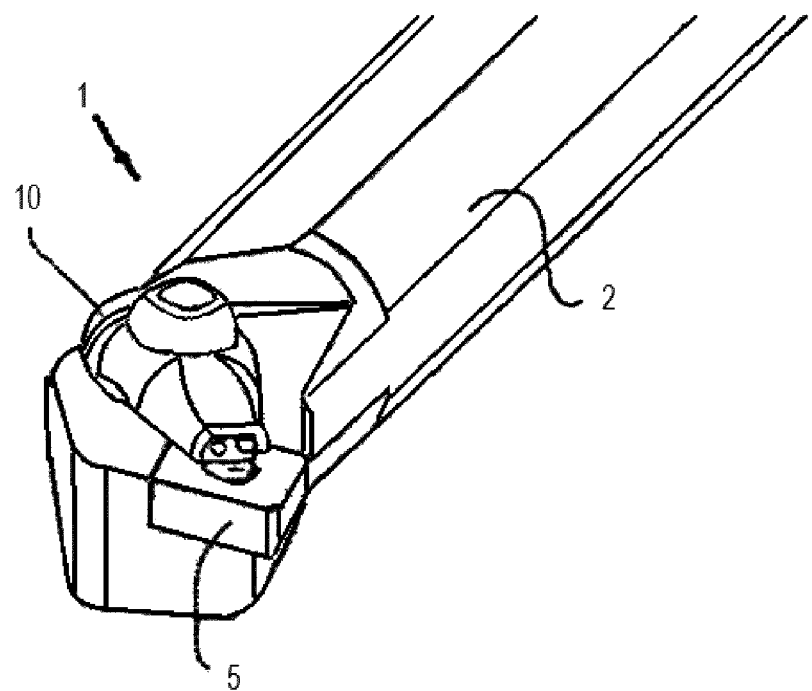
FIG. 1 is a perspective view of a metal cutting tool according to an embodiment of the invention.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that the disclosure will be thorough and complete, and will fully convey the scope of the invention to those skilled in the art. Like reference numbers refer to like elements throughout. The elements illustrated in the drawings are not necessary according to scale. Some elements might have been enlarged in order to clearly illustrate those elements.

FIG. 1 illustrates a metal cutting tool (1) according to an embodiment the invention. The metal cutting tool (1) comprises a tool holder body (2), a cutting insert (5) mounted in the tool holder body (2), and a nozzle (10) for providing coolant fluid to a cutting edge of the metal cutting tool (1). The metal cutting tool (1) according to this embodiment is a turning tool.

Figure 2:
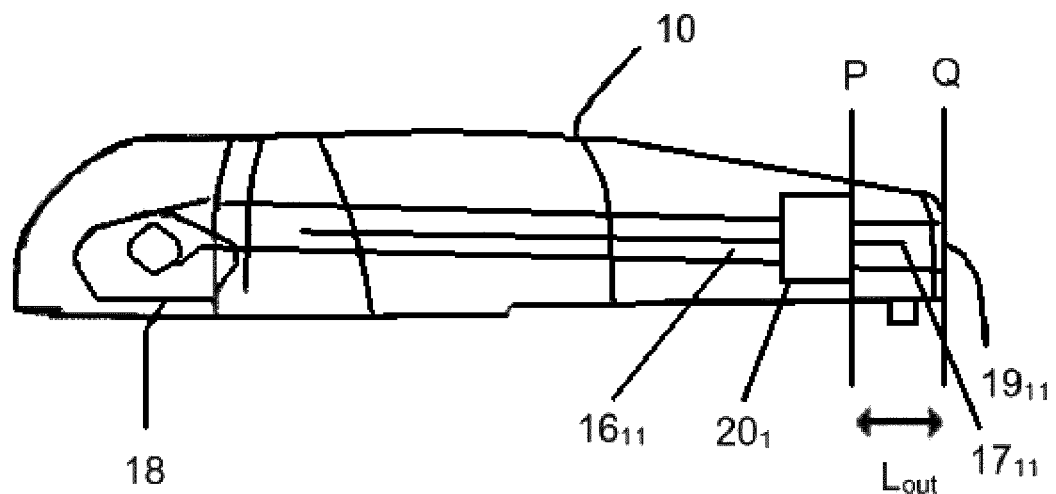
FIG. 2 is a side view of a nozzle according to a first embodiment of the invention.

FIG. 2 illustrates a side view of the nozzle (10) according to a first embodiment of the invention. The nozzle (10) comprises an internal inlet coolant channel (16$_{11}$) connected to a coolant inlet (18) and an internal outlet coolant channel (17$_{11}$), with a length L$_{out}$, connected to a coolant outlet (19$_{11}$) for ejecting coolant fluid towards a cutting edge of the metal cutting tool. The nozzle (10) further comprises a plenum chamber (20$_1$) connecting the internal inlet coolant channel (16$_{11}$) and internal outlet coolant channel (17$_{11}$). The outlet coolant channel (17$_{11}$) is connecting to the plenum chamber (20$_1$) in a plane Q and the coolant outlet (19$_{11}$) is located in a plane P. In the illustrated embodiment the plane Q is parallel with the plane P.

Figure 3A:
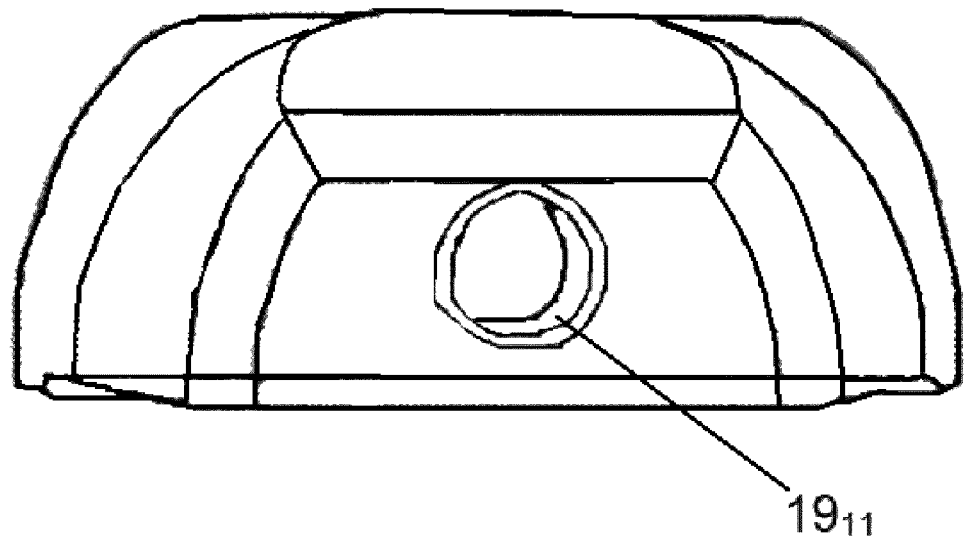
FIG. 3A is a front view of a nozzle according to a first embodiment of the invention.

FIG. 3A illustrates a front view of a nozzle (10) according to a first embodiment of the invention. In this embodiment, the nozzle (10) comprises one coolant outlet ($19_{11}$) for ejecting the coolant fluid towards a cutting edge of the metal cutting tool.

Figure 4A:
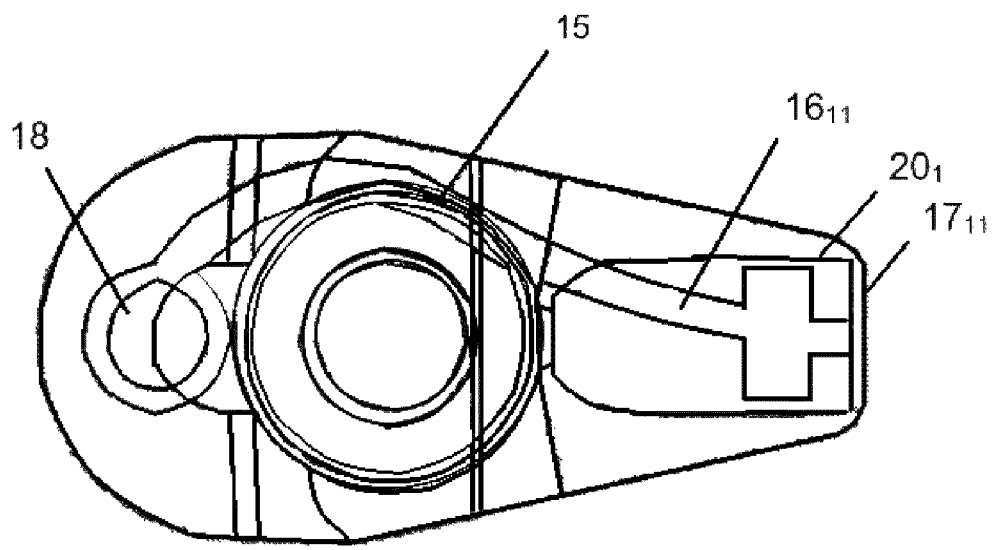
FIG. 4A is a top view of a nozzle according to a first embodiment of the invention.

FIG. 4A illustrates a top view of a nozzle (10) according to a first embodiment of the invention. In this embodiment, the nozzle (10) comprises one internal inlet coolant channel ($16_{11}$) connecting to a coolant inlet (18) and one plenum chamber ($20_1$). The nozzle (10) further comprises one internal outlet coolant channel ($17_{11}$) connecting to a coolant outlet ($19_{11}$) and the plenum chamber ($20_1$). The nozzle (10) further comprises a bore (15) for a fastening element, e.g. a screw, for fastening the nozzle (10) to the tool holder body (2).

In the following, alternative embodiments will be described, focusing on differenting features.

Figure 3B:
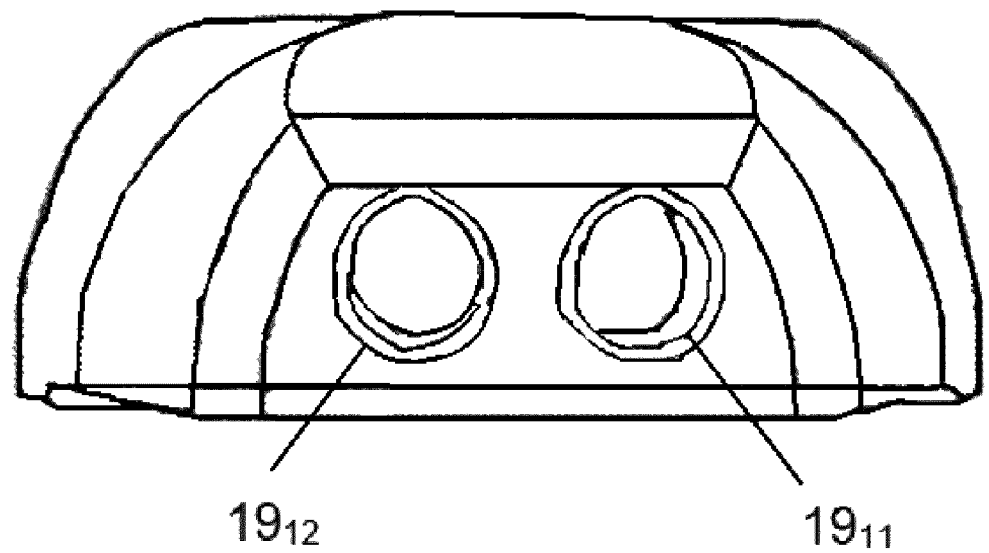
FIG. 3B is a front view of a nozzle according to a second embodiment of the invention.

FIG. 3B illustrates a front view of a nozzle (10) according to a second embodiment of the invention. In this embodiment, the nozzle (10) comprises two coolant outlets ($19_{11}$; $19_{12}$) for ejecting the coolant fluid towards a cutting edge of the metal cutting tool.

Figure 4B:
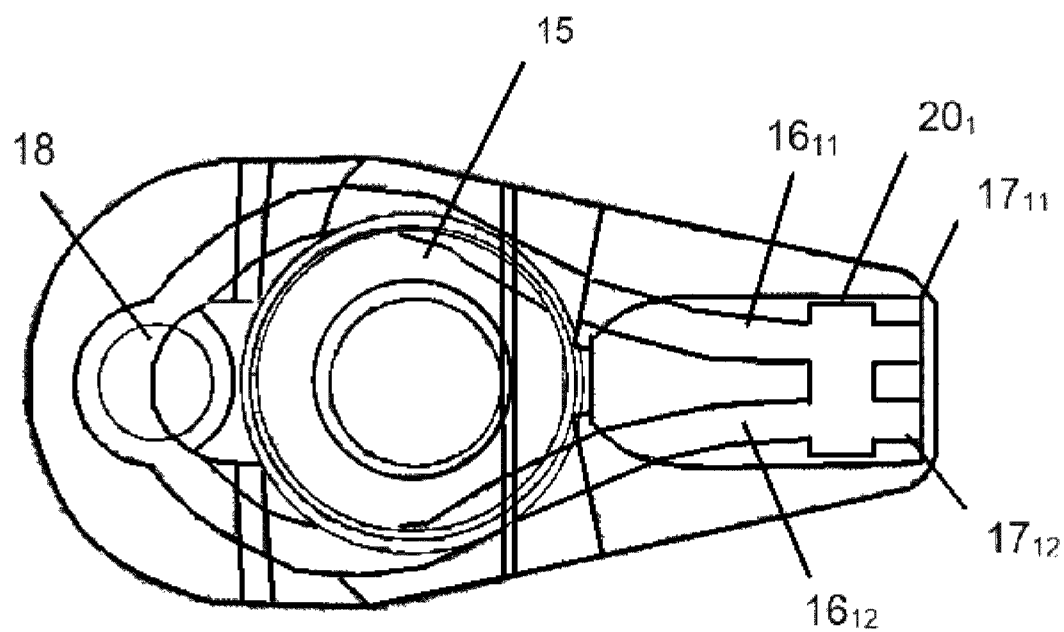
FIG. 4B is a top view of a nozzle according to a second embodiment of the invention.

FIG. 4B illustrates a top view of a nozzle (10) according to a second embodiment of the invention. In this embodiment, the nozzle (10) comprises two internal inlet coolant channels ($16_{11}$; $16_{12}$) connecting to a coolant inlet (18) and one plenum chamber ($20_1$). The nozzle (10) further comprises two internal outlet coolant channels ($17_{11}$; $17_{12}$) connecting to two coolant outlets ($19_{11}$; $19_{12}$) and the plenum chamber ($20_1$). The nozzle (10) further comprises a bore (15) for a fastening element, e.g. a screw, for fastening the nozzle (10) to the tool holder body (2).

Figure 5:
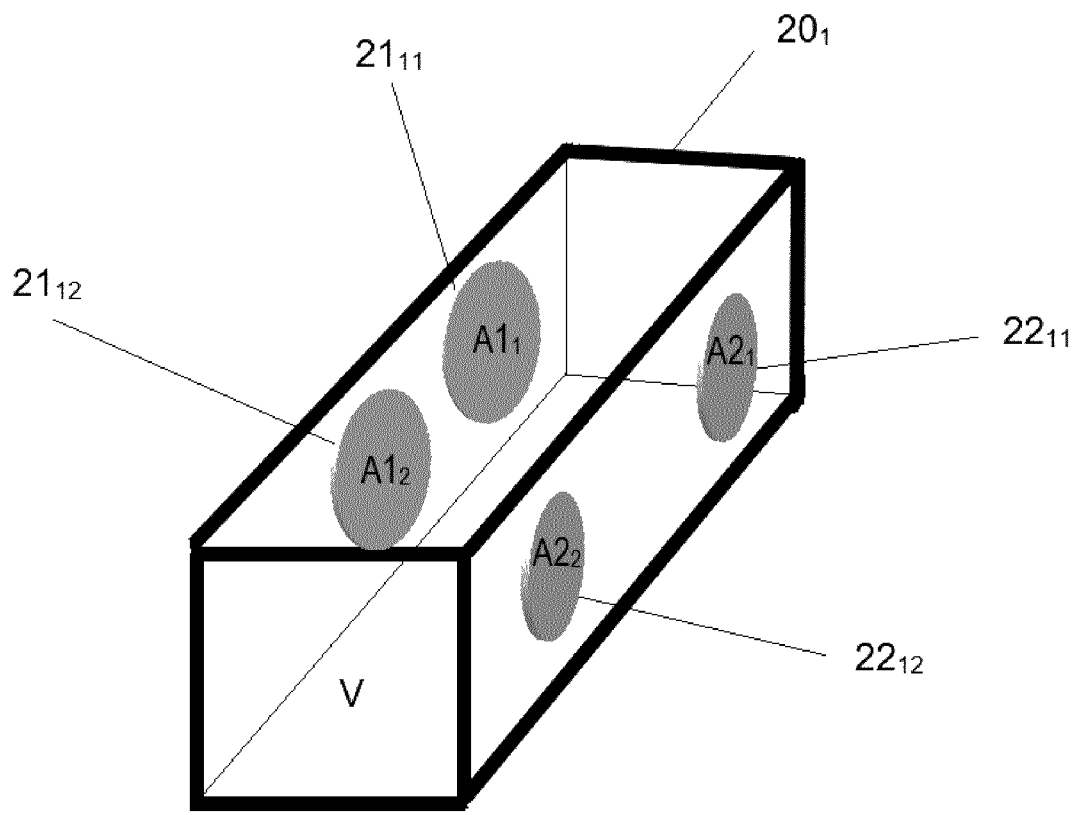
FIG. 5 is a schematic view of the plenum chamber in the nozzle according to the second embodiment of the invention as illustrated in FIG. 4B.

FIG. 5 illustrates schematically the plenum chamber ($20_1$) of the second embodiment. The plenum chamber ($20_1$) has an internal volume V and comprises a first inlet opening ($21_{11}$) having a cross-sectional area $A1_1$, and a second inlet opening ($21_{12}$) having a cross-sectional area $A1_2$. The plenum chamber ($20_1$) further comprises a first outlet opening ($22_{11}$) having a cross-sectional area $A2_1$, and a second outlet opening ($22_{12}$) having a cross-sectional area $A2_2$.

In FIG. 5, the plenum chamber ($20_1$) is illustrated as a rectangular block, and the inlet openings ($21_{11}$; $21_{12}$) and the outlet openings ($22_{11}$; $22_{12}$) as circular openings. However, in other embodiments, other geometrical shapes could be given, such as for example a spherical plenum chamber with square shaped inlet openings and triangular outlet openings.

Figure 4C:
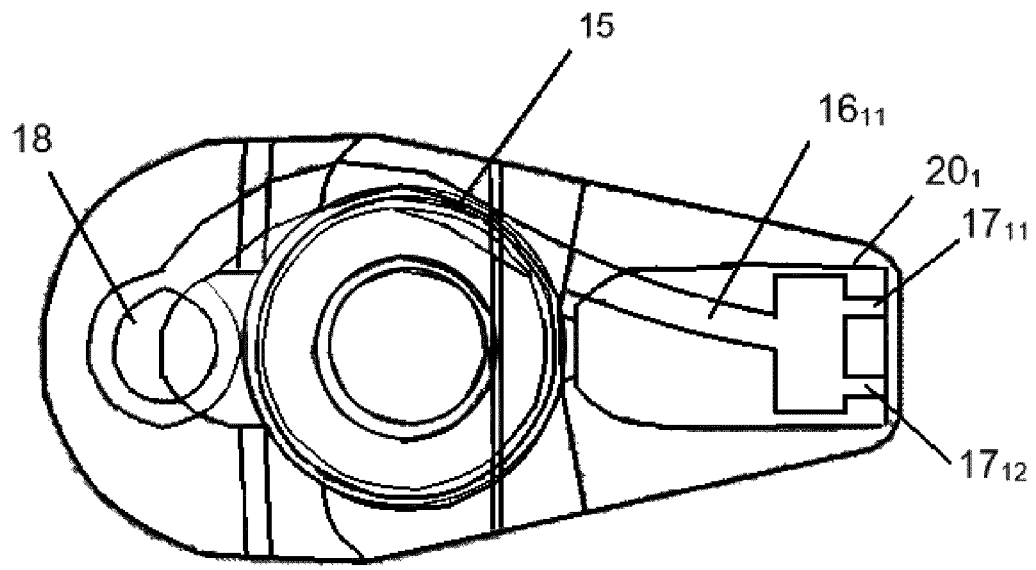
FIG. 4C is a top view of a nozzle according to a third embodiment of the invention.

FIG. 4C illustrates a top view of a nozzle (10) according to a third embodiment of the invention. In this embodiment, the nozzle (10) comprises one internal inlet coolant channel ($16_{11}$) connecting to a coolant inlet (18) and one plenum chamber ($20_1$). The nozzle (10) further comprises two internal outlet coolant channels ($17_{11}$; $17_{12}$) connecting to two coolant outlets ($19_{11}$; $19_{12}$) and the plenum chamber ($20_1$). The nozzle (10) further comprises a bore (15) for a fastening element, e.g. a screw, for fastening the nozzle (10) to the tool holder body (2).

Figure 4D:
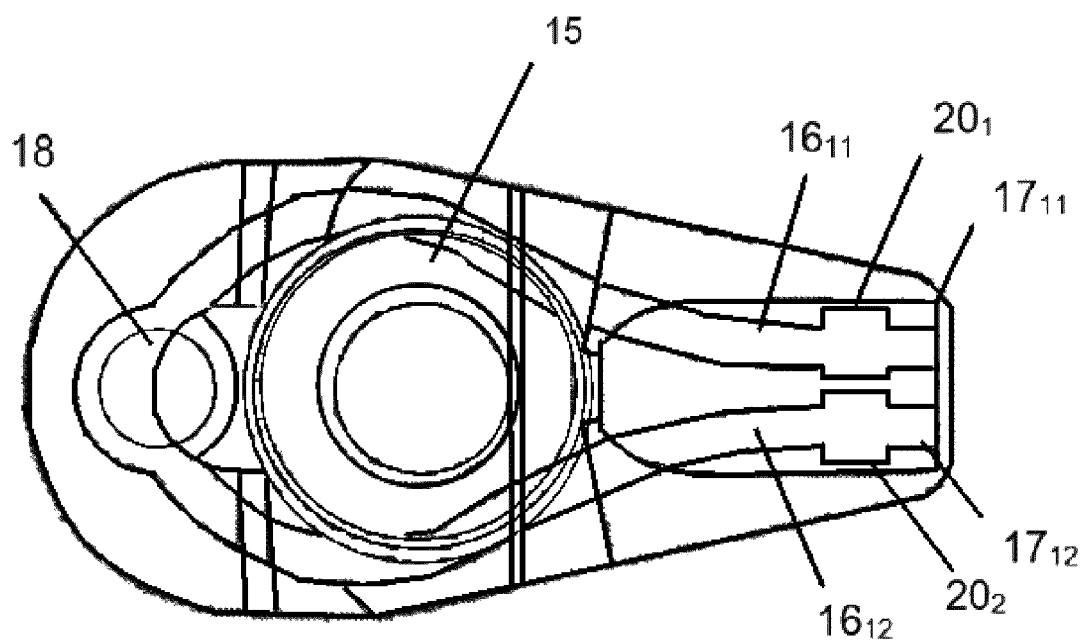
FIG. 4D is a top view of a nozzle according to a fourth embodiment of the invention.

FIG. 4D illustrates a top view of a nozzle (10) according to a fourth embodiment of the invention. In this embodiment, the nozzle (10) comprises a first internal inlet coolant channel ($16_{11}$) connecting to a coolant inlet (18) and a first plenum chamber ($20_1$). The nozzle (10) further comprises a second internal inlet coolant channel ($16_{21}$) connecting to a coolant inlet (18) and a second plenum chamber ($20_2$). Further, the nozzle (10) comprises a first internal outlet coolant channel ($17_{11}$) connecting to a coolant outlet ($19_{11}$) and the first plenum chamber ($20_1$), and a second internal outlet coolant channel ($17_{21}$) connecting to a coolant outlet ($19_{21}$) and the second plenum chamber ($20_2$). The nozzle (10) further comprises a bore (15) for a fastening element, e.g. a screw, for fastening the nozzle (10) to the tool holder body (2).

In the second and fourth illustrated embodiments, the two internal inlet coolant channels ($16_{11}$; $16_{12}$; $16_{21}$) connects to the same coolant inlet (18). However, they could also connect to different coolant inlets.

The invention claimed is:

1. A nozzle arranged for providing coolant fluid to a cutting edge of a metal cutting tool, the nozzle comprising:
   a first internal inlet coolant channel and a second internal inlet coolant channel; and
   a first internal outlet coolant channel and a second internal outlet coolant channel, wherein the first and second internal inlet coolant channels are connected to a coolant inlet, and the first internal outlet coolant channel is connected to a first coolant outlet for directing the coolant fluid to the cutting edge, and the second internal outlet coolant channel is connected to a second coolant outlet for directing the coolant fluid to the cutting edge;
   a bore arranged for receiving a fastening element;
   a plenum chamber including a first inlet opening connecting the first internal inlet coolant channel and the at least one plenum chamber and a second inlet opening connecting the second internal inlet coolant channel and the plenum chamber, and
   a first outlet opening connecting the first internal outlet channel and the plenum chamber and a second outlet opening connecting the second internal outlet channel and the plenum chamber, wherein the first inlet opening has a cross-sectional area $A1_1$ and the second inlet opening has a cross-sectional area $A1_2$, and the first outlet openings has a cross-sectional area $A2_1$ and the second outlet opening has a cross-sectional area $A2_2$, wherein $(A1_1+A1_2)>(A2_1+A2_2)$, and wherein the first and second inlet openings are located in a first plane and wherein the first and second outlet openings are located in a second plane P, wherein the first plane is parallel to the second plane P.

2. The nozzle according to claim 1, wherein the first and second coolant outlets are located in a plane Q, wherein the plane P is parallel with the plane Q.

3. The nozzle according to claim 1, wherein the first internal outlet coolant channel is linear with a constant cross-sectional area $A2_1$ is constant, and wherein the second internal outlet coolant channel is linear with a constant cross-sectional area $A2_2$.

4. The nozzle according to claim 1, wherein the first and second internal outlet coolant channels have a length $L_{out}$, wherein 0.5 mm $\leq L_{out} \leq$ 2.0 mm.

5. The nozzle according to claim 1, wherein $$1.3 \leq \frac{A1_1 + A1_2}{A2_1 + A2_2} \leq 56.3.$$

6. The nozzle according to claim 1, wherein 1.5 mm² $\leq A1_1$, $A1_2 \leq$ 15.0 mm².

7. The nozzle according to claim 1, wherein the plenum chamber has an internal volume V, wherein 40 mm³ $\leq V \leq$ 420 mm³.

* * * * *